United States Patent

Wood et al.

[11] Patent Number: 5,706,861
[45] Date of Patent: Jan. 13, 1998

[54] REHABILITATION OF PIPELINES AND PASSAGEWAYS WITH A FLEXIBLE LINER USING AN INFLATIBLE BLADDER

[75] Inventors: Eric Wood, deceased, late of Castletown; Miranda J. Bull, administrator, Peel, both of Isle of Man

[73] Assignee: Insituform (Netherlands) B.V., Netherlands

[21] Appl. No.: 284,697
[22] PCT Filed: Feb. 12, 1993
[86] PCT No.: PCT/GB93/00296
§ 371 Date: Oct. 20, 1994
§ 102(e) Date: Oct. 20, 1994
[87] PCT Pub. No.: WO93/16320
PCT Pub. Date: Aug. 19, 1993

(Under 37 CFR 1.47)

[30] Foreign Application Priority Data

Feb. 13, 1992 [GB] United Kingdom ............... 9203005

[51] Int. Cl.[6] .................................. F16L 55/16
[52] U.S. Cl. .................. 138/98; 138/97; 156/287; 405/154
[58] Field of Search .................. 138/97, 98, 93; 156/287; 264/269; 405/154

[56] References Cited

U.S. PATENT DOCUMENTS

| | | | |
|---|---|---|---|
| 1,605,782 | 11/1926 | Rota | 138/98 |
| 2,311,196 | 2/1943 | Ahern | 138/93 |
| 3,334,691 | 8/1967 | Parker | 138/93 |
| 4,340,046 | 7/1982 | Cox | 138/93 |
| 4,461,230 | 7/1984 | Hartley et al. | 138/93 |
| 4,526,207 | 7/1985 | Burkley et al. | 138/93 |
| 4,778,553 | 10/1988 | Wood | 138/98 |
| 5,203,377 | 4/1993 | Harrington | 138/98 |
| 5,322,653 | 6/1994 | Müller | 138/98 |

FOREIGN PATENT DOCUMENTS 2728056 1/1979 Germany ................ 138/98

*Primary Examiner*—Patrick Brinson
*Attorney, Agent, or Firm*—Cowan, Liebowitz & Latman, P.C.; Michael I. Wolfson

[57] ABSTRACT

An assembly which can be inserted into a pipeline or passageway on which a curable resin impregnated flexible lining is placed about an inflatable bladder is provided. The bladder is mounted to one end of a core pipe and folded over on itself. Medium flowing in the pipeliner passageway can pass through the core pipe during a lining operation. The core pipe is of sufficiently rigid nature to withstand inflation pressure to move the lining tube into the pipeliner passageway surface by inflation of the bladder, but yet is sufficiently flexible and bendable so as to bend enabling it follow curbs and falls in the pipeliner passageway into which it is inserted. Temporary holding means restrain the liner during insertion.

12 Claims, 4 Drawing Sheets

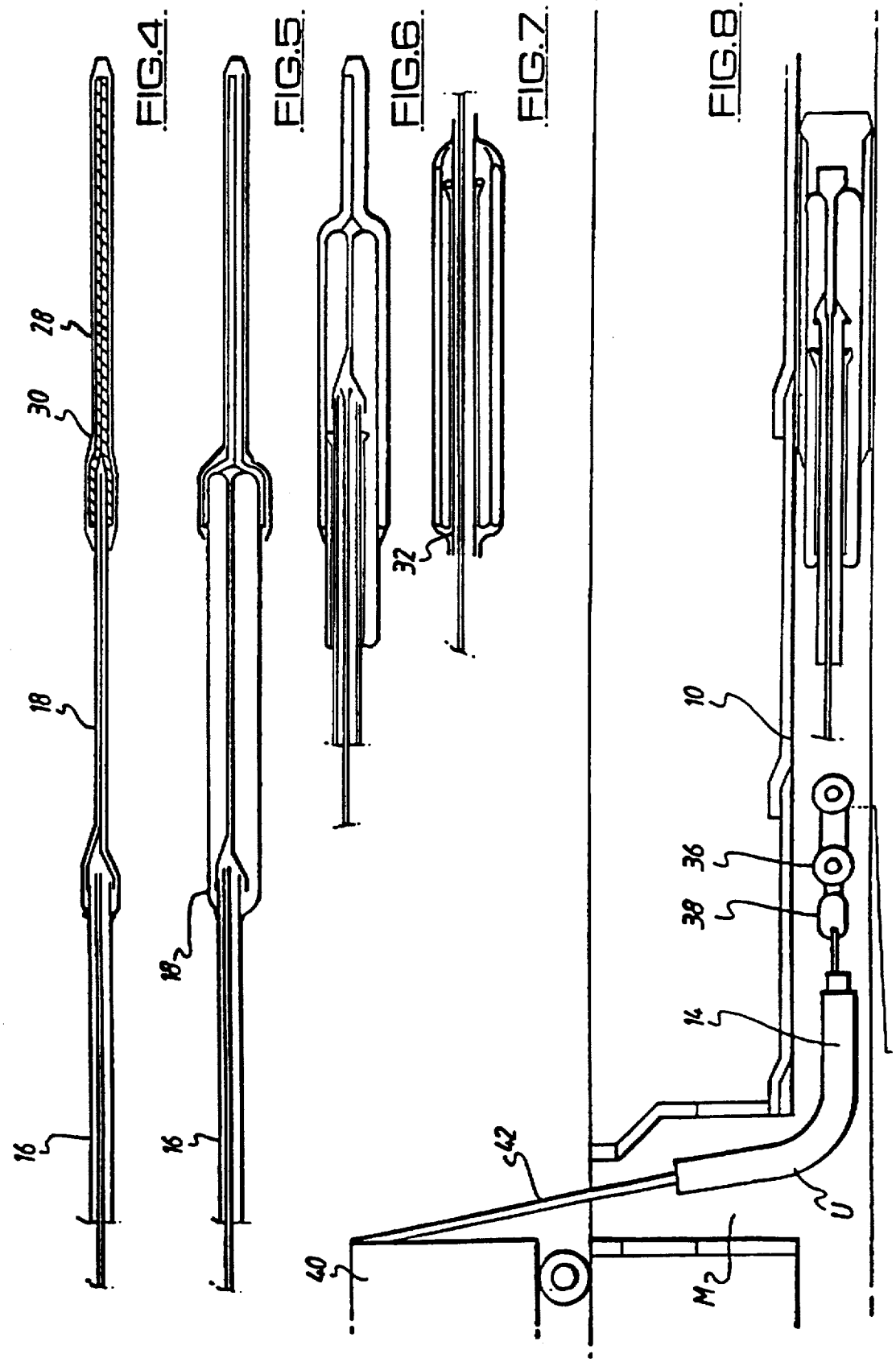

REHABILITATION OF PIPELINES AND PASSAGEWAYS WITH A FLEXIBLE LINER USING AN INFLATIBLE BLADDER

BACKGROUND OF THE INVENTION

1. Field of the Invention

This invention relates to the lining of pipelines or passageways.

2. Description of the Prior Art

This invention relates to the lining of pipelines or passageways, using materials which are now referred to as "cured in place" materials. Specifically, "cured in place" materials comprise flexible lining tubes including absorbent materials such as fibrous felts, e.g. polyester felts which are impregnated with curable synthetic resin such as polyester or epoxy. Whilst the lining tube is still flexible and is so impregnated, it is held by fluid (liquid and/or gas) pressure against the surface of the pipeline or passageway to be lined, so that it conforms to the surface shape of the pipeline or passageway, and whilst so held it is caused to become hard or rigid by curing of the said synthetic resin. The method of curing may be any of a number of methods including curing by heat, curing by radiation such as ultra violet radiation, or curing by ultrasonics. When heat is used the inflating medium may be heated whilst in the case of light cure and ultrasonic cure resins, an appropriate light or ultrasonic source As pulled through the applied lining tube. Some resins such as epoxy resins cure naturally, and are referred to as ambient curing resins, and these may be used if required.

Various methods as disclosed An U.S. Pat. Nos. 4,064,211 and 4,009,063 have been proposed for curing "cured in place" systems, including that the lining tube, having been pre-impregnated, may be everted into the pipeline or passageway, or alternatively may be pulled into the pipeline or passageway and then inflated, for example by means of an everting membrane. Arrangements have been suggested for effecting the impregnation of the lining tube whilst it is in or whilst it is moving into the pipeline or passageway to be cured as disclosed in U.S. Pat. No. 4,602,974.

Generally speaking, the known methods comprise inserting the lining tube into the pipeline or passageway so as to cover the surface of the pipeline or passageway between respective access points of the pipeline or passageway, such access points comprising for example access manholes, but frequently complete lining of the pipeline or passageway between man-holes is not necessary, as for example it may be the case that only a section of a pipeline or passageway has a defect or is in a poor state of repair such as to require relining by a "cured in place" method. The present invention is devoted to the provision of a system and method for the lining of a section of a pipeline or passageway.

There have been proposals for repairing sections of underground pipelines or passageways using "cured in place" lining tubes, and one such proposal is disclosed in U.S. Pat. No. 5,044,405 wherein a length of the impregnated lining tube is carried inside a flexible carrier tube. The carrier tube is in turn located inside an outer tubular casing, and the entire assembly is located in position inside the pipeline or passageway having the section to be lined. The interior of the casing is pressurized in order to evert the carrier tube and with it the lining tube out of the end of the casing and into fluid pressure contact on the section of pipeline or passageway to be lined. The pressure is maintained whilst the resin is caused to cure by any suitable method, and then the carrier tube and and casing are detached from the lining tube leaving the cured lining tube in position lining the appropriate section of the pipeline or passageway. The use of the carrier tube and casing make the method somewhat complicated as many steps are to be carried out An order to create the assembly which is inserted in the pipeline or passageway.

The present invention provides a simpler method of installation by arranging that an inflatable bladder as the lining tube applied to the outside thereof, and in this connection is might be mentioned that the lining tube may be a continuous tube when view in cross sectional elevation, or it may be a tube formed by a flat web wrapped round the bladder with the meeting edges overlapped. In some cases it is advantageous to overlap the lining tube in this way because then the lining tube need not be critically matched to the pipeline or passageway inner diameter as it will take up the correct diametrical dimension as the bladder is inflated and the degree of overlap of the edges of the lining tube will vary.

Patent specification WO 90/12243 does disclose that it is known to provide a core member around which is an inflatable bladder, and the lining tube is applied over the bladder so as to be inflated by the bladder into contact with the pipeline or passageway surface, but the core member in connection with that proposal is made up of a number of rigid sleeves which are tensioned together by means of steel cables which pass through apertures in the sleeves. The sleeve ends are configured so as to be complimentary and to interfit whereby the length of the core member can be varied as required.

A disadvantage of that arrangement is that the core member by its construction inhibits the feeding of the assembly the pipeline or passageway, because pipelines or passageways often have bends and curves and the lining and bladder are relatively delicate items which if dragged against for example the surface of an underground pipeline or passageway which is in the form of a sever, could well tear and fracture these components.

SUMMARY OF THE INVENTION

The present invention is concerned with providing an arrangement wherein an assembly including a core member and inflatable bladder with a "cured in place" lining tube thereon can be effectively positioned in an underground pipeline or passageway.

In accordance with the present invention, in a first aspect, a method of lining a section of a pipeline or passageway by a "cured in place" system comprises providing a length of lining tube which is impregnated with a curable synthetic resin and carrying that lining tube on an assembly including an annular inflatable bladder to the inside of which is provided a core tube, transporting the assembly to the section of pipeline or passageway to be lined, inflating the annular inflatable member to press the length of lining tube to said section of the pipeline or passageway and effecting the cure of same, the said core tube being a flexible unitary continuous hollow tube of sufficient rigidity to support the air pressure and of sufficient bendability to enable it to bend round curves and corners around which the assembly must pass in travelling along the pipeline or passageway to said section.

In this connection, the core or central tube, although having rigidity, in fact is of a semi-rigid construction such that it can bend slightly so as to follow the curvature of the pipeline or passageway, and also is of sufficient hoop stress to withstand an internal vacuum, because in a preferred arrangement the tube serves as a means for applying a vacuum to the assembly in order to hold the length of lining tube and the annular inflation member in collapsed condition whilst the assembly is introduced into the pipeline or passageway. Typically the rigid tube maybe a rigid rubber like material of sufficient thickness to meet the characteristics indicated above.

By virtue of providing the assembly with the central rigid tube, arrangements can be made such that several assemblies can be provided on the tube and can be applied to different sections of the pipeline or passageway simultaneously, and if the pipeline or passageway has normally accommodates liquid flowing medium, the medium can continue to flow through the tube whilst the assembly is being inserted and curing is taking place.

The present invention also provides an assembly for introduction into a pipeline or passageway, said assembly comprising a core tube surrounded by an annular inflatable bladder, said core tube being of sufficient rigidity to support the bladder when inflated without collapse of the core tube and also being of sufficient bendability to enable it to bend around curves in the pipeline or passageway into which it is inserted.

The core tube may be connected by one of its ends only to the bladder which may also be tubular formed with an inner side and an outer side but which sides are integrally connected at one end of the bladder. This construction provides that the core tube may be moved into and out of the bladder which action causes the bladder to evert and invert in the nature of a rolling pig which means that the inner side and outer side change positions when the assembly is fed into the pipeline or passageway the core tube is inside the bladder and for the purposes of clarity of explanation the terms "inner side" and "outer side" as applied to the bladder mean the inner side and outer side in relation to the core tube when the core tube is inside the bladder.

To construct the unit comprising the assembly and lining tube to be inserted in the pipeline or passageway, a length of the lining tube duly impregnated may have the bladder introduced thereinto by rolling the bladder inside out upon itself, and at the same time introducing the core tube into the central region of the pig. In this connection the bladder may communicate with a pressure hose contained inside the core tube whereby air for inflating the bladder may be provided.

The unit is constructed above ground, and then is introduced into the pipeline or passageway for subsequent inflation, the unit having the bendability of the core enabling it to be fed down manholes and along the pipeline or passageway.

To the outside of the length of lining tube there may be provided a film encasing the lining tube, and which also serves as a means enabling the creation of a vacuum inside the film thereby to collapse the assembly onto the core tube, and there may be an aperture in the central core tube enabling the vacuum to be created inside the external film.

BRIEF DESCRIPTION OF THE DRAWINGS

Embodiments of the present invention will now be described, by way of example, with reference to the accompanying diagramatic drawings, wherein;

FIG. 4–7 show the method of assembling the arrangement of FIG. 1;

FIG. 8 is a diagram showing the introduction of the assembly of FIG. 1 into the pipe and also showing how the centre portion of the assembly is extracted upon completion of the curing;

DETAILED DESCRIPTION

Figure 1:
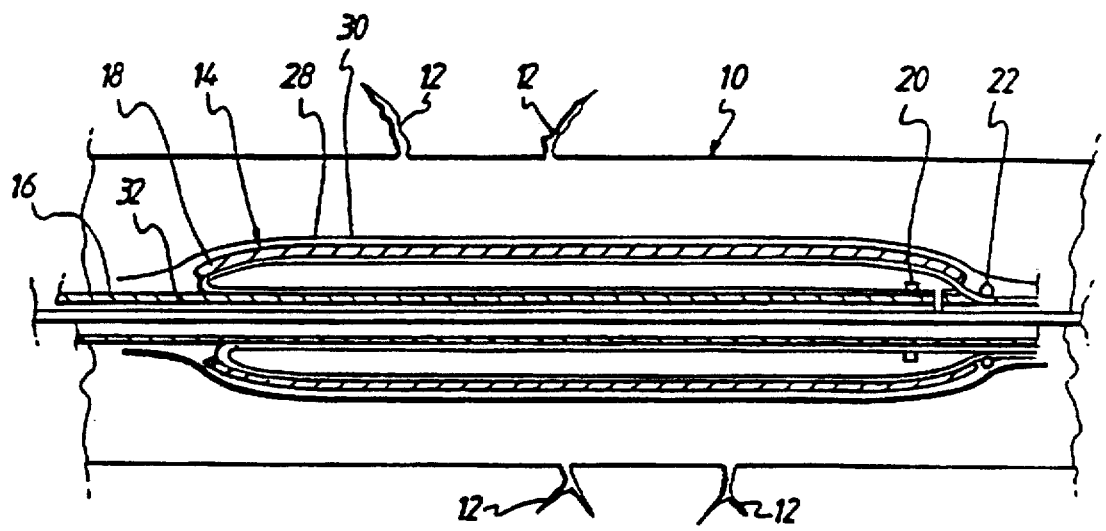
FIG. 1 is a sectional side view inside a sewer pipe having a section to be lined and shows a lining tube and assembly in accordance with an embodiment of the invention.

Referring to the drawings, and firstly to FIG. 1, a length of sewer pipe (10) to be lined with a length of cured in place lining tube is shown as having imperfections (12) giving rise to the reason for the lining operation. It is assumed that the remainder of the pipe Is otherwise sound, and complete relining of the pipe is therefore inappropriate.

In register with the section (10) to be lined is shown a unit (14) which comprises a tubular construction having a central core tube or pipe (16) of hard rubber to the like of sufficient rigidity to withstand an inflation pressure and internal vacuum which as will be explained is applied thereto, but is bendable so as to be capable of following any bends or curves in the pipe (10) as the unit (14) is fed thereinto, as will be explained. The pipe (16) may be of corrugated construction and have internal reinforcing and circumferentially extending metal wires in the corrugations so that it can function as described above.

Surrounding the pipe (16) Is an annular inflation bladder (18) Of flexible plastics material, and formed in an endless arrangement in that tubular bladder (18) is defined by a length of tubular flexible and inflatable material turned inside upon itself, so that its ends as indicated by (20) and (22) are sealingly anchored to the tube (16) at one end only so as to form an annular pocket which can be inflated by means of an air pressure hose (24) and in particular an outlet (26) thereof which opens into the chamber created by the inflation member between the said ends (20) and (22).

The tube (18) may for example be of a silicone material so that it can be removed from the assembly after the inflation operation as will be described.

Surrounding the annular tubular bladder (18) is the length of lining tube (28) which comprises suitably a tube or overlay of felt material which is impregnated thoroughly with a curable synthetic resin. The felt may typically be of polyester fibres, and a polyester resin may be used for the impregnation. Other felts and mixtures and other resins can be used.

Surrounding the felt layer (28) is a shrouding tubular film (30) to complete the unit.

In the condition of FIG. 1, the assembly is in flexible but collapsed condition, to enable it to be fed into the pipe (10) so that there is in fact as shown a substantial clearance between the shroud (30) and the surface of the pipe (10).

This arrangement is achieved in that a vacuum is drawn through an aperture (32) in the pipe (16) which leads to the inside of the shroud (30), but to the outside of the inflation bladder (18) thereby by drawing the assembly tightly onto the pipe (16). To this end sealing tapes may be applied to the ends of the shroud (32) to prevent vacuum leaks.

Figure 2:
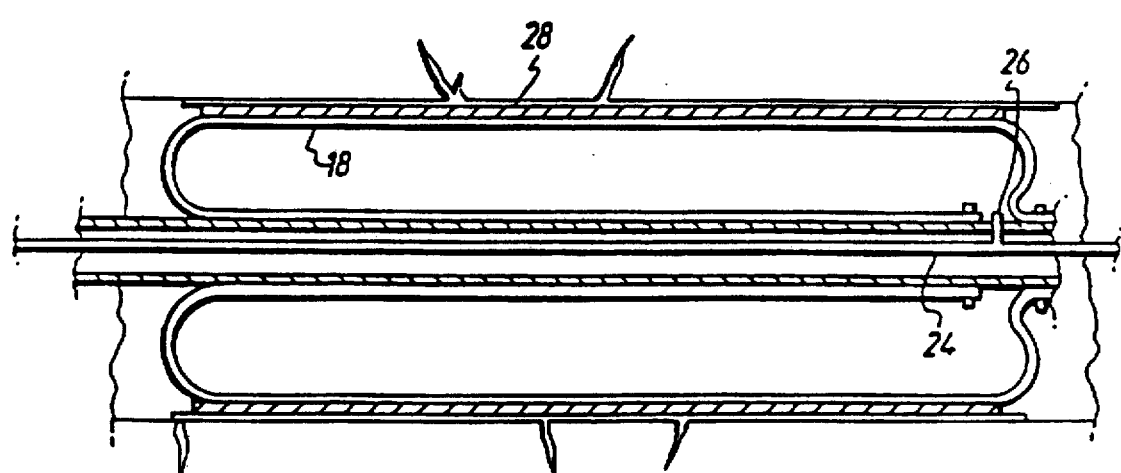
FIG. 2 is a view similar to FIG. 1, but showing the assembly bladder in inflated condition.
Figure 3:
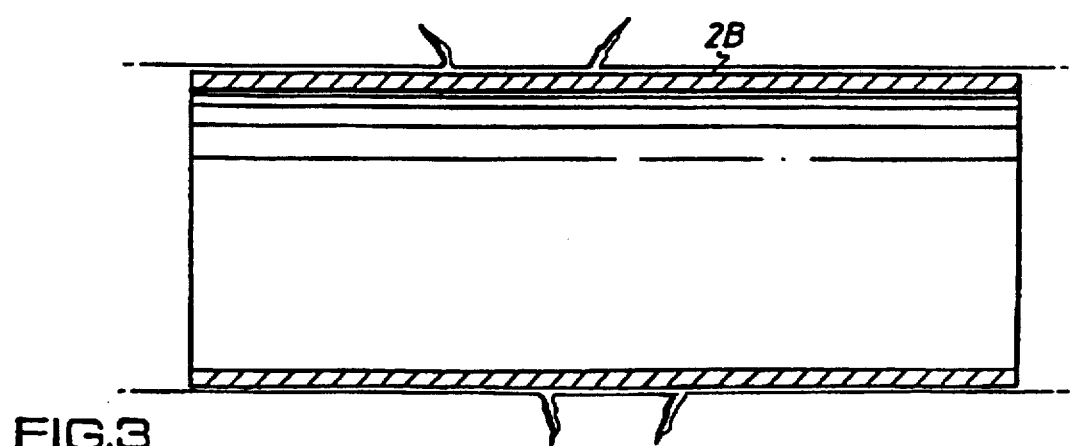
FIG. 3 is a view similar to view 1, but showing the lining tube after the resin thereof has been cured.

When the unit is in position, as shown in FIG. 2 the vacuum inside the pipe (16) is removed, and the interior of the inflation bladder (18) is pressurised so as to blow up the lining tube length (28), to cause it to be forced to the surface of a pipe (10), as shown clearly in FIG. 2. Whilst in this condition the resin is allowed to cure or is caused to cure by some initiation means such as heat, light, ultrasonics or the like, and after curing takes place, the pipes (16) and the inflation bladder (18) are withdrawn leaving the cured resin lining (28) in place as shown in FIG. 3. FIG. 4–7 illustrate how the assembly (14) is put together, and it will be seen than initially from FIG. 4 the lining tube length (28) with its shroud (30) is arranged end to end with the inflation bladder (18), from which has been pulled core pipe (16) so that it is arranged end to end with the pipe (16). The right hand end of the inflation tube (18) is introduced into the interior of the lining tube length (28), and the right hand end of the pipe (16) is inside the left hand end of the inflation tube (18).

It is now simply a matter of inflating the inflation tube (18) for example to a low pressure in the order of 5 p.s.i. as shown in FIG. 5 and then the inflated member (18) is evened into the lining tube (28), by progressively pushing the pipe (16) into the interior of the inflation tube (18) as shown in FIG. 6, (the lining tube being held by hand pressure if necessary) until the arrangement indicated in FIG. 7 is reached. The pressure is removed from the inflation tube (18), and then vacuum is applied through the port (32), to cause the assembly to collapse to the FIG. 1 condition.

FIG. 8 shows that the assembly (14) can be introduced by means of a traction apparatus (36) with a vacuum coupling (38) from a ground level trailer (40), there being appropriate air hoses (42) connected through the central pipe (16) of the assembly to enable the inflation and deflation of the assembly inflation bladder (18) as described above for the completion of the insertion.

FIG. 8 shows that the unit marked 'U' can be fed down a manhole 'M' and fed into the pipe.(10) bending as it turns from the manhole 'M' into the pipe (10), without collapse of the core tube (16), which is an important aspect of the present invention. This bendability of the unit 'U' is also important when the unit lies to transverse underground pipes which curve as it is important not to have heavy frictional forces on the unit 'U' as it is travelling along the pipe (10).

An effective means is therefore provided for positioning and applying a length of lining tube of a "cured in place" type to a specified section of a pipeline. The positioning of the assembly (14) may take place by any conventional means such as by the use of a television camera, or by arranging for some pre-determined datum to be established and in relation to which the assembly (14) is positioned, but such positioning method is not part of the present invention.

Referring now to FIGS. 9–13, which show an alternative embodiment of the invention, the assembly shown is constructed and operates in the same principle as already described in relation to the previous embodiment, but includes a number of modifications which also can be included in the embodiment of FIGS. 1–8. The unit shown in FIGS. 9–13 is put in place in the manner already described in relation to the previous figures.

Figure 9:
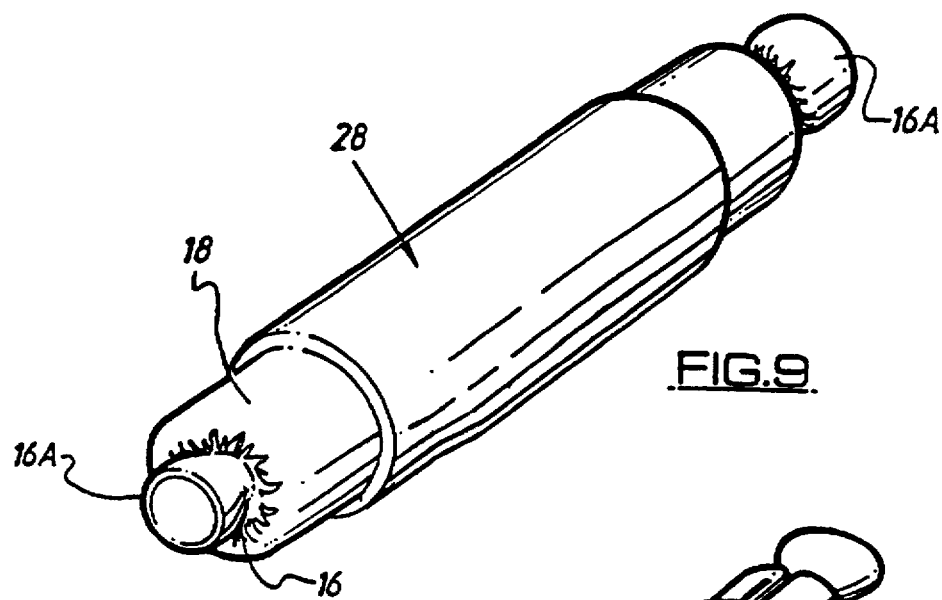
FIG. 9 shows an arrangement similar to FIG. 7 when in the FIG. 7 condition.

Referring to these drawings, in FIG. 9, the unit shown is in the position corresponding to the position shown in FIG. 7 for the previously described unit, and similar reference numerals are used in relation to the equivalent parts already described in relation to the previous figures. Thus, the lining tube is indicated by reference 28, and it is shown as being supported on the inflated bladder (18) which in turn receives centrally thereof the core pipe (16). The core pipe (16) has enlarged ends (16A) which may be formed by shaping the pipe ends or by adding thereto enlargement rings or the like. These ends (16A) stabilize the pipe inside the inflated bladder (18), and if such enlargement (16A) are not provided, there can be a tendancy for the core pipe (16) to be held by the bladder in a slightly unstable manner such that the merest force might cause the pipe (16) to be ejected from the bladder as the bladder rolls upon itself. The enlarged ends inhibit this difficulty.

Figure 10:
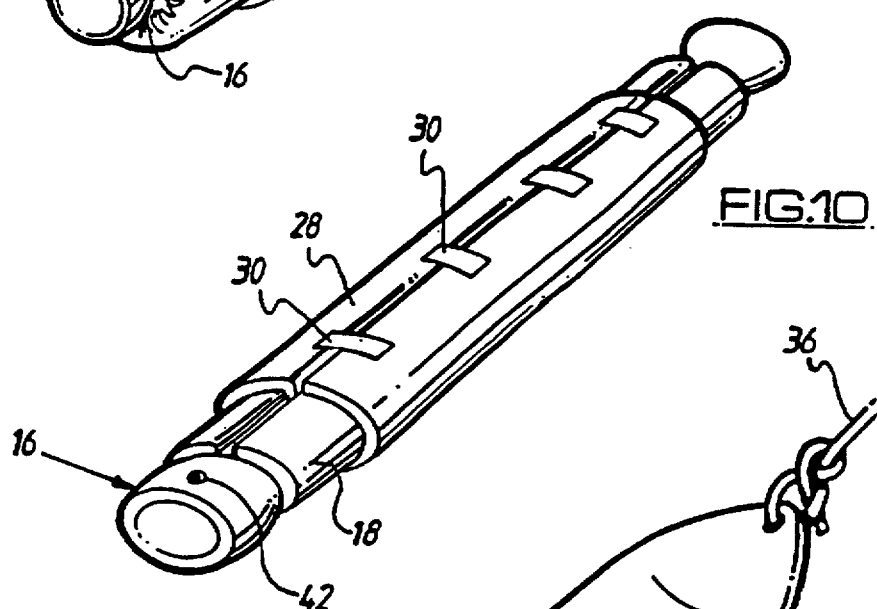
FIG. 10 shows the arrangement of FIG. 9 when the bladder is collapsed.
Figure 11:
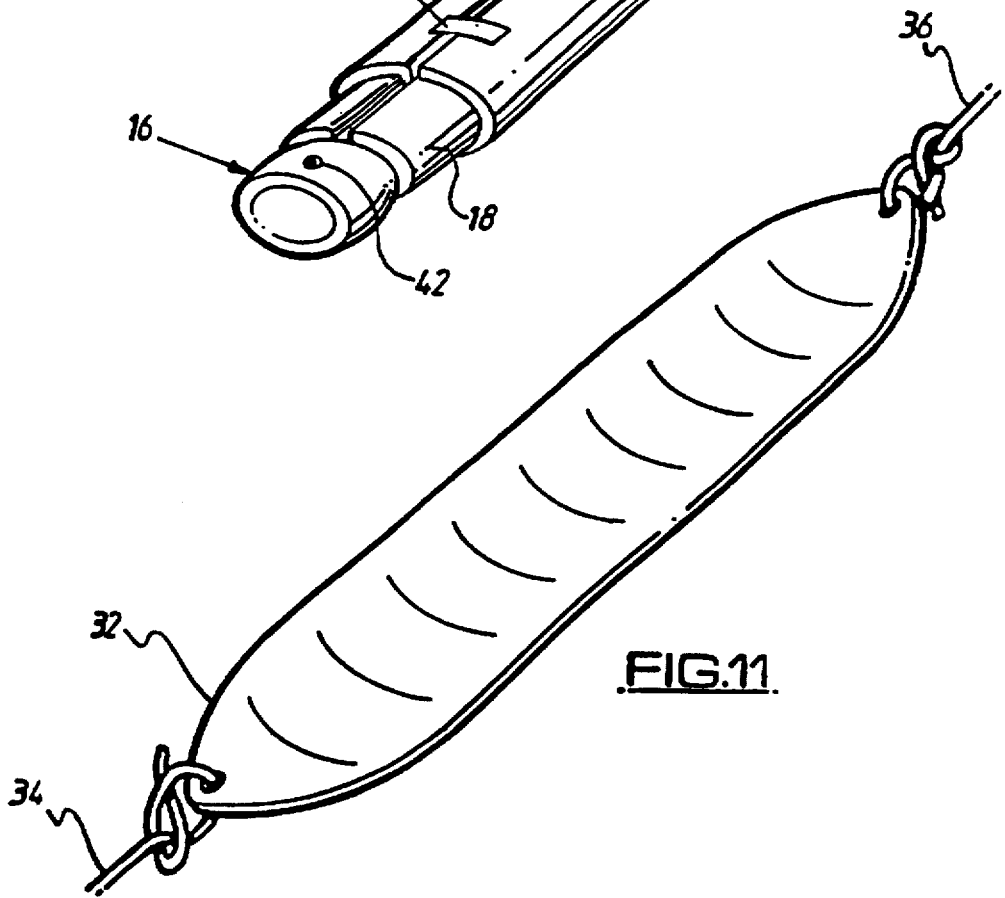
FIG. 11 shows a transporter for the arrangement of FIG. 10 to enable it to be transported into the sewer.

In collapsing the bladder (18) from the FIG. 9 position the FIG. 10 position, any suitable arrangement may be adopted such as by simply exhausting the air inside the bladder or by positively withdrawing it through suitable means. For example the air may be withdrawn through pipe (24) which also serves as the air pressure pipe.

When the bladder is collapsed, the bladder and the lining (28) are then folded around the core pipe (16) as shown in FIG. 10, and the meeting edges of the lining tube (28) are temporarily held by means of adhesive tapes (30) applied across the meeting edges as shown. The assembly in the condition shown in FIG. 10 is inserted into the pipeline or passageway by being carried on a transporter (32) which resembles a hammock and is made of a sheet of flexible material such as a reinforced plastic sheet. The ends of the hammock transporter (32) are connected to pull ropes (34) and (36) by which the assembly can be inserted in the pipeline or passageway.

Figure 12:
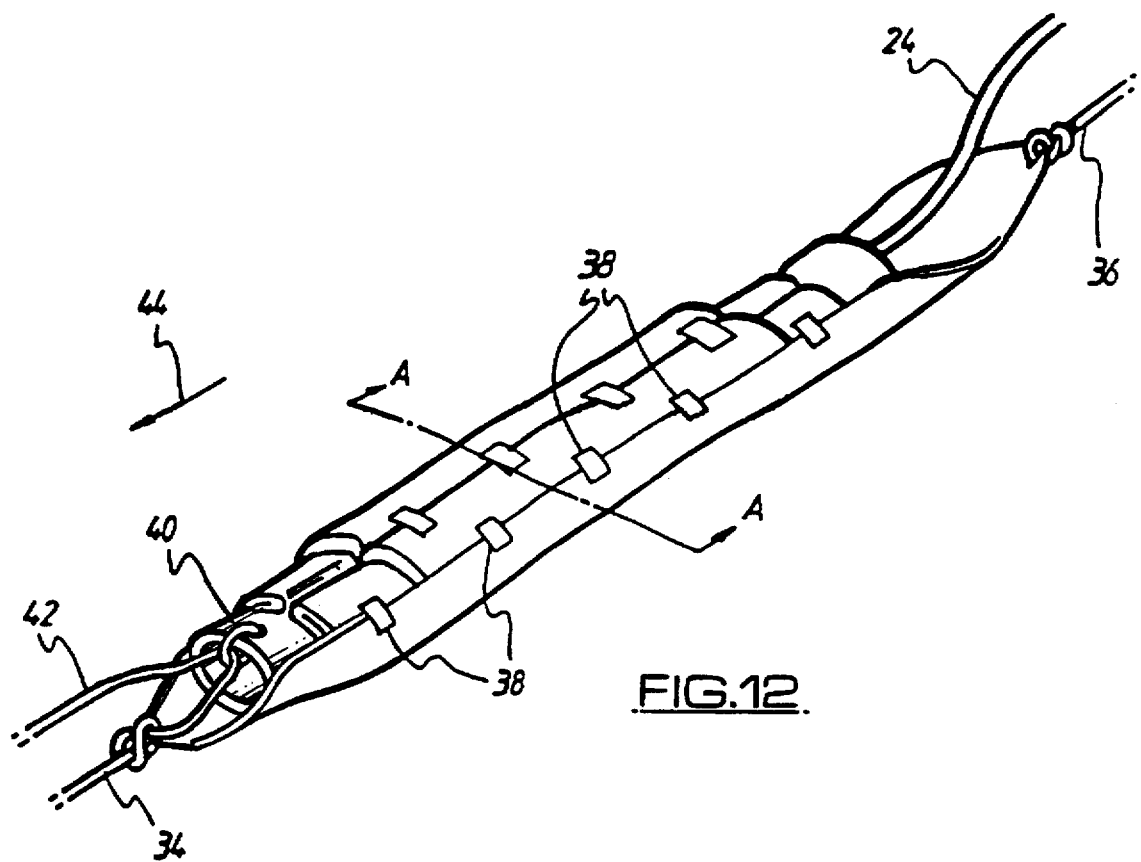
FIG. 12 shows the arrangement of FIG. 10 when carried by the transporter of FIG. 11 and having transporting lines connected thereto.

FIG. 12 shows that the hammock transporter (32) after it receives the unit of FIG. 10 is wrapped around the sides of the unit and further temporary adhesive holding patches (38) are applied across the transporter edges and the adjacent bladder and lining tube as shown in FIG. 12.

FIG. 12 also shows the air line (24), and at the other end of the assembly the guide ring (40) Which passes through an aperture (42) in the end (16A) of core pipe (16) so that an extension of rope (34) in the form of a slip rope (42) can pass therethrough as shown.

Figure 13:
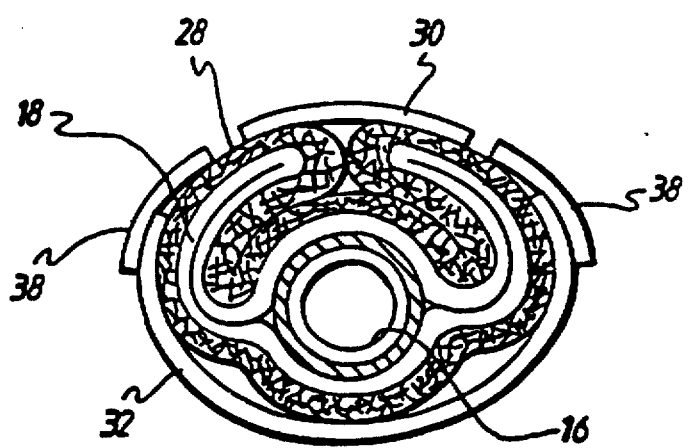
FIG. 13 is a sectional elevation of the arrangement of FIG. 12 taken on the line A—A of FIG. 12

FIG. 13 shows the arrangement of FIG. 12 in sectional elevation.

The assembly of FIG. 12 is pulled into the underground pipeline or passageway in the direction of arrow (44) by pulling on ropes (34) and (42), the rope (36) serving as a hold back means in order to control the in feed of the assembly into the pipeline or passageway. Positioning of the assembly of FIG. 12 inside the pipeline or passageway is again by any suitable means such as a television camera, and the entire assembly shown in FIG. 12 as the bendability hereinbefore referred to enabling smooth positioning of the assembly with minimal damage due to friction on the components of the assembly as it travels around curved sections of the pipeline or passageway. In this connection, the slip rope (42) serves to prevent the assembly of FIG. 10 from slipping relative to the hammock transporter (32) should the unit rub against the pipeline or passageway walls in its travel to its final position.

When the unit is in its final position, rope (34) is pulled whilst air line (24) is held, so that the transporter (32) separates from the assembly of FIG. 10, such assembly remaining in the correct position. During this separation, the slip rope (42) is allowed to slip through ring (40) and it will also be separated from the assembly. Hold back rope (36) travels with the transporter (32), and therefore is removed from the pipeline or passageway leaving the assembly in the correct position. It is to be mentioned that during this separation operation, the adhesive patches (38) yield due to the separating forces.

It is now simply a matter of inflating the bladder (18) to break the holding effect of the tapes (30) and to allow the assembly to inflate to the condition shown in FIG. 9 and also as shown in FIG. 2 cured by the lining tube is applied against the surface to be aligned and the procedure is similar to that already described in relation to the previous figures.

The core pipe (16) and the bladder (18) are removed by pulling on the air line (24) to pull out the core pipe and to invert the bladder (18) and to peel it away from the cured lining tube leaving the condition as shown in FIG. 3.

By the provision of the central rigid pipe (16), simultaneous inflation of a number of assemblies inside the pipeline may be effected.

What is claimed is:

1. A method of lining a section of a pipeline or passageway by a "cured in place" system comprising providing a length of lining tube which is impregnated with a curable synthetic resin and carrying that lining tube on an assembly including an annular inflatable bladder to the inside of which is provided a core tube, transporting the assembly to the section of pipeline or passageway to be lined, inflating the annular inflatable bladder to press the length of lining tube to said section of the pipeline or passageway and effecting the cure of same, the core tube being a flexible unitary continuous hollow tube of sufficient rigidity to support the air pressure and sufficiently bendable to enable it to bend round curves and corners around which the assembly must pass in travelling along the pipeline or passageway to said section with the bladder deflated during the said transportation, and the bladder and lining tube being folded to a collapsed condition and held in such condition by temporary holding means which release their hold upon the bladder when inflated and allows the liquid flowing medium, normally accommodated by the pipeline, to continue to flow through the core while the assembly is being inserted and curing of the length of the lining tube is taking place.

2. A method according to claim 1, wherein the assembly is carried by a transporter in the form of a hammock having pull ropes at opposite ends thereof by which the assembly and hammock are moved into position into the pipeline or passageway.

3. The method of claim 1, wherein the bladder is defined by a length of inflatable tubular material turned in upon itself with adjacent free ends connected to one end of the core.

4. The method of claim 3, including the steps of curing the resin and removing the assembly by pulling the assembly away from the cured liner so as to invert the bladder as it is withdrawn from the pipeline or passageway.

5. An assembly for introduction into a pipeline or passageway and for the application to a section of said pipeline or passageway of a "cured in place" lining tube, said assembly comprising a flexible unitary hollow core tube having at least one aperture and an annular inflatable bladder surrounding said core and aperture, said core tube being of sufficient rigidity to support the bladder when inflated without collapse of the core tube and also being sufficiently bendable to enable it to bend round curves in the pipeline or passageway into which it is inserted, an annular inflatable bladder surrounding said core, wherein the bladder is defined by a length of inflatable tubular material turned in upon itself to form an inner side and an outer side, and the adjacent free ends of the inner and outer sides are connected at one end to the core tube on opposite sides of the aperture enabling the insertion of air under pressure in order to inflate the bladder.

6. A method of providing an assembly whereby a section of a pipeline or passageway may be lined by a "cured in place" lining system wherein a length of lining tube impregnated with synthetic resin is arranged end to end with an annular inflation bladder tube, which in turn is laid end to end with a core pipe to which the inflation tube is attached, and wherein the inflation tube is everted into the lining tube by pushing the core tube into the centre of the inflation tube so that in the final assembly the inflation tube surrounds the core tube and the lining tube surrounds the inflation tube, followed by deflation of the inflation tube to form the assembly for insertion in the pipeline or passageway.

7. A method according to claim 6 wherein the core tube is provided with enlarged ends to prevent the lining tube from rolling off either end of the core tube.

8. A method for lining a section of a pipeline or passageway with a cured in place liner segment, comprising:

placing a resin impregnated liner segment on an apparatus having a continuous unitary flexible hollow tubular core with an aperture and an inflatable bladder of material turned in upon itself with adjacent free ends connected to the core on opposite sides of the aperture;

collapsing the liner about the bladder;

applying temporary holding means to restrain the liner in a collapsed condition to form a lining assembly;

introducing the lining assembly into the pipeline at the location to be repaired;

applying fluid pressure to the bladder through the aperture to inflate the bladder and liner and release the holding means;

continuing to apply fluid pressure until the resin cures;

removing the fluid pressure from the bladder; and removing the apparatus from the pipeline.

9. The method of claim 8, wherein the bladder is everted as it is removed from the pipeline.

10. A device for lining a section of a pipeline or passageway with a cured in place liner segment, comprising:

a core of a continuous unitary flexible hollow tubular member having an aperture;

an inflatable bladder defined by a length of material turned in upon itself to form an inner side and an outer side with adjacent free ends connected at one end to the core on opposite sides of the aperture;

a liner segment impregnated with a curable resin and disposed about the bladder, the liner segment in a collapsed form and temporary holding means for temporary holding the liner in the collapsed form about the core; and pressure means for providing fluid pressure to the interior of the bladder via the aperture;

whereby upon pressurizing the bladder, the temporary holding means are released and the bladder expands the liner segment against the inner wall of the pipeline and allows the resin to cure for repair of the pipeline and allows the continuous flow of liquid medium through the core tubular member while the device is being inserted and the inflatable bladder is pressurized while the liner segment is being cured.

11. The device for lining a section of a pipeline or passageway of claim 10, further including transported means for moving the device into position in the pipeline or passageway.

12. The device for lining a section of pipeline or passageway of claim 10 wherein the core tubular member has a longitudinal lumen which allows the continuous flow of liquid medium through the core tubular member while the device is being inserted and the inflatable bladder is pressurized while the liner segment is being cured.

* * * * *